N. B. Hadley,
Scroll Saw.
No. 106,153.
Patented Aug. 9, 1870.
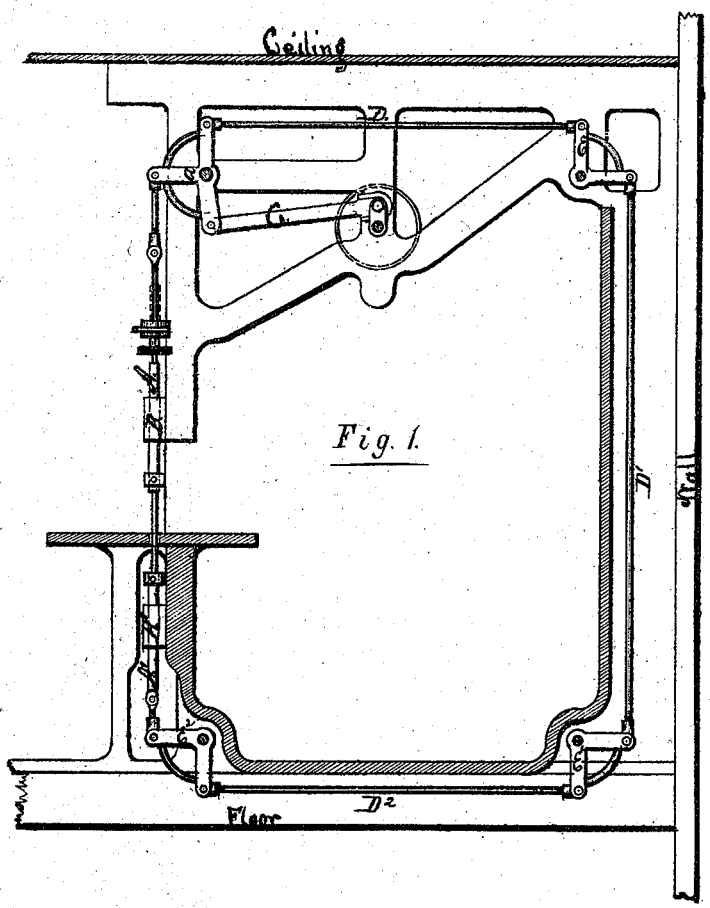
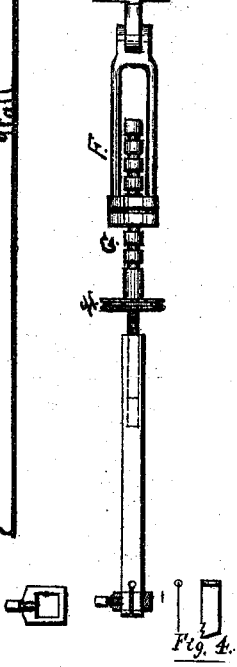
Fig. 1.
Fig. 2.
Fig. 3.
Fig. 4.
Witnesses:
Inventor: N. B. Hadley

United States Patent Office.

NICHOLAS B. HADLEY, OF PROVIDENCE, RHODE ISLAND.

Letters Patent No. 106,153, dated August 9, 1870.

IMPROVEMENT IN SCROLL-SAW.

The Schedule referred to in these Letters Patent and making part of the same

*To all whom it may concern:*

Be it known that I, NICHOLAS B. HADLEY, of the city and county of Providence, in the State of Rhode Island, have invented a new and improved "Scroll-Saw;" and I do hereby declare that the following specification, taken in connection with the drawing making a part of the same, is a full, clear, and exact description thereof.

Figure 1 is a view in section and elevation of my improved scroll-saw.

Figures 2, 3, and 4 are parts of the same, detached.

The object of my invention is to so construct the operating mechanism of a scroll-saw that the ordinary supporting posts or timbers may be dispensed with, thus giving to the material being operated upon entire freedom as to space, and also to provide such mechanism with certain other improvements, having reference to securing and adjusting the saw, hereinafter more particularly described and claimed.

The various mechanisms now in use for operating "scroll-saws" have usually been constructed upon such principles, and so arranged as to require supporting from the floor, the supporting timbers or posts coming so near the saw as to seriously interfere with the convenient mannagement of the material being worked. Such mechanisms have usually employed a carriage sliding between two uprights, to which carriage the saw is attached, and from which it receives its perpendicular motion. This arrangement, however, upon each change of movement, produces a sudden bend in the saw, and a subsequent jerk, which not only frequently breaks and damages the saw itself, but affects the quality of the work being performed.

In my invention I attach the frame-work that supports the mechanism to the ceiling, the side, and the floor of the room, as shown in fig. 1.

The saw is attached at each end to bars A and A', in the manner hereinafter described, which slide in guides B and B' upon the frame.

The bar A is connected to the horizontal arm of the lever *a*, which is pivoted to the frame, and receives its motion from a pulley through the crank C, and communicates the same, by reason of such connection, to the bar A, and consequently to the saw.

A corresponding movement is communicated to the bar A', which holds the lower end of the saw, from the lever *a* through the rods D D¹ D², and the levers E E¹ E².

By communicating motion to the bar A' in this manner, my mechanism is arranged in the form of a parallelogram, and all supporting posts or frame-work from the floor entirely dispensed with, so that the material being sawed, while on the table, may be freely moved in any desired direction; at the same time the steadiness of movement obtained by this arrangement relieves the saw from any sudden jerk, and from all liability to bend.

I do not attach the saw to the bars A and A' by drilling it at each end to receive a pin or screw, as is usually done, which weakens it, and increases its liability to break, but add to the strength of the saw by providing each end with a circular enlargement, as shown in fig. 4, and insert the ends of the saw thus made in the ends of the bars A and A' mortised to receive them, and secure them therein by means of a collar and thumb-screw, as shown in fig. 2.

In case, however, the saw should become shorter by breaking, or otherwise, it would become necessary to adjust the bars A and A' to the length of the saw; for this purpose I connect the bar A, as shown in figs. 2 and 3, to the lever *a*, by a fleeting connection consisting of the yoke F, and the rod G, which is provided with a series of annular grooves, and the head of the yoke F with a latch, as shown in fig. 3, which fits into the grooves upon the rod G, and secure it at any desired length, the adjustment being completed, and the saw brought to its proper tension by the thumb-screw H.

What I claim as my invention, and desire to secure by Letters Patent, is—

1. The mechanism herein shown for operating a "scroll-saw," consisting of a series of quadrants, in combination with a series of parallel rods, the whole constructed and arranged in the manner substantially as described.

2. The fleeting connection shown in fig. 2, consisting of the yoke F, the rod G, latch and thumb-screw H, the whole constructed and arranged in the manner substantially as described.

3. A saw provided with a circular enlargement at each end, and attached to the bars A and A', in the manner substantially as described.

N. B. HADLEY.

Witnesses:
 WALTER B. VINCENT,
 GEORGE O. FALL.